United States Patent
Rosenboom

(10) Patent No.: US 9,919,751 B1
(45) Date of Patent: Mar. 20, 2018

(54) TRACK ASSEMBLY

(71) Applicant: Lyn A. Rosenboom, Clifton, IL (US)

(72) Inventor: Lyn A. Rosenboom, Clifton, IL (US)

(*) Notice: Subject to any disclaimer, the term of this patent is extended or adjusted under 35 U.S.C. 154(b) by 2 days.

(21) Appl. No.: 15/340,124

(22) Filed: Nov. 1, 2016

Related U.S. Application Data

(60) Provisional application No. 62/252,608, filed on Nov. 9, 2015.

(51) Int. Cl.
*B62D 55/08* (2006.01)
*B62D 55/14* (2006.01)
*B62D 55/24* (2006.01)
*A01B 76/00* (2006.01)

(52) U.S. Cl.
CPC ............. *B62D 55/08* (2013.01); *A01B 76/00* (2013.01); *B62D 55/14* (2013.01); *B62D 55/244* (2013.01)

(58) Field of Classification Search
CPC ...... B62D 55/08; B62D 55/14; B62D 55/244; A01B 76/00
USPC ....... 305/157, 158, 160, 165, 167, 170, 171, 305/178, 184
See application file for complete search history.

(56) References Cited

U.S. PATENT DOCUMENTS

| | | |
|---|---|---|
| 2,476,460 A | 7/1949 | Smith |
| 5,018,591 A | 5/1991 | Price |
| 5,433,515 A | 7/1995 | Purcell et al. |
| 5,447,365 A * | 9/1995 | Muramatsu ........ C09K 19/3466 305/167 |
| 6,086,169 A | 7/2000 | Keehner |
| 7,252,347 B2 | 8/2007 | Gingras |
| 7,367,637 B2 * | 5/2008 | Gleasman ............ B62D 55/244 305/157 |

* cited by examiner

*Primary Examiner* — S. Joseph Morano
*Assistant Examiner* — Jean Charleston
(74) *Attorney, Agent, or Firm* — Philip L. Bateman

(57) ABSTRACT

A track assembly has at least one double wheel having a recess between the inside wheel and the outside wheel. The inner surface of the continuous belt has a raised support that contacts and conforms to the recess of the double wheel.

6 Claims, 4 Drawing Sheets

TRACK ASSEMBLY

CROSS-REFERENCE TO RELATED APPLICATION

This application claims the benefit of U.S. Provisional Application Ser. No. 62/252,608, Nov. 9, 2015.

FIELD OF THE INVENTION

This invention relates to motor vehicles. More particularly, this invention relates to track assemblies for land vehicles.

BACKGROUND OF THE INVENTION

A track assembly is a vehicle propulsion system in which a continuous belt (also known as a band, a tread, or a track) is driven by one or more drive wheels. Track assemblies are widely used in military equipment (e.g., tanks), construction equipment (e.g., bulldozers), and farm equipment (e.g., tractors). Military equipment and heavy construction equipment typically have belts made of interconnected metal plates. Farm equipment typically have belts made of reinforced synthetic rubber. When compared to wheels, a track assembly makes contact with the ground over a much greater surface area. The increased surface area provides greater traction, less compaction of the ground, and improved ability to function in muddy conditions.

A wide variety of track assemblies are known. A simplified track assembly 10 is shown in FIGS. 1 to 4. The track assembly has a drive wheel 20, an unpowered idler wheel 30, a road wheel 40 (also known as a bogie wheel), and a belt 50. The wheels are typically formed of an inner wheel 21 and an outer wheel 22 with a recessed inner portion 23. The double wheel construction reduces weight. The inner surface of the track contains a series of guide blocks 51 that fit within the inner wheels and the outer wheels and keep the track aligned. The track is shown in phantom lines in FIG. 2 for illustration purposes. A section of the track is shown in FIG. 3 with the height of the guide blocks exaggerated for illustration purposes. The track assembly is shown from an end in FIG. 4. The upper and lower portions of the track are shown as sections. The upper and lower portions of the track are shown spaced apart from the double wheels for illustration purposes.

Track assemblies on farm equipment (agricultural implements) work well in the fields where the weight of the vehicle is distributed over the entire ground-contacting portion of the track. However, farm equipment must often be driven on paved roads. When driven on paved roads, the weight of the vehicle is concentrated where the double wheels contact the lower portion of the belt. For example, a track assembly having a contact surface area in a field of twenty or more square feet may have an effective contact surface area on a paved road of only one or two square feet. The small effective contact surface area causes heating and rapid wear on the rubber belt.

The rubber belts on farm equipment sometimes contain transverse teeth on their inner surfaces for engaging drive wheels having gears. Such belts are disclosed in Smith, U.S. Pat. No. 2,476,460, Jul. 19, 1949; and Price, U.S. Pat. No. 5,018,591, May 28, 1991. These transverse teeth do not support the drive wheels. In other words, the drive wheels do not exert a downward gravitational force upon the transverse teeth.

The rubber belts on farm equipment sometimes contain guide blocks running lengthwise along the belt for keeping the belt in alignment. Such belts are disclosed in Purcell et al., U.S. Pat. No. 5,433,515, Jul. 18, 1995; Keehner, U.S. Pat. No. 6,086,169, Jul. 11, 2000; and Gingras, U.S. Pat. No. 7,252,347, Aug. 7, 2007. These guide blocks do not support the drive wheels. In other words, the drive wheels do not exert a downward gravitational force upon the guide blocks.

Although a variety of track assemblies are known, there continues to be a demand for an improved track assembly. More particularly, there is a demand for a track assembly with an increased effective contact area between the wheels and the belt when the vehicle with the track assembly travels on a paved road.

SUMMARY OF THE INVENTION

The general object of this invention is to provide an improved track assembly. A more particular object is to provide a track assembly with an increased effective contact area between the wheels and the belt when the vehicle with the track assembly travels on a paved road.

I have invented an improved track assembly. The track assembly comprises: (a) at least one double wheel having an inside wheel, an outside wheel, and a recess between the inside wheel and the outside wheel; and (b) a continuous belt having an inner surface with a raised support that contacts and conforms to the recess of the double wheel so the recess exerts a gravitational force upon the support when the track assembly is on a paved flat surface.

The track assembly of this invention has an increased effective contact area between the wheels and the belt when the vehicle with the track assembly travels on a paved road. As a result, the belt suffers much less wear when the vehicle travels on paved roads.

DETAILED DESCRIPTION OF THE INVENTION

Figure 5:
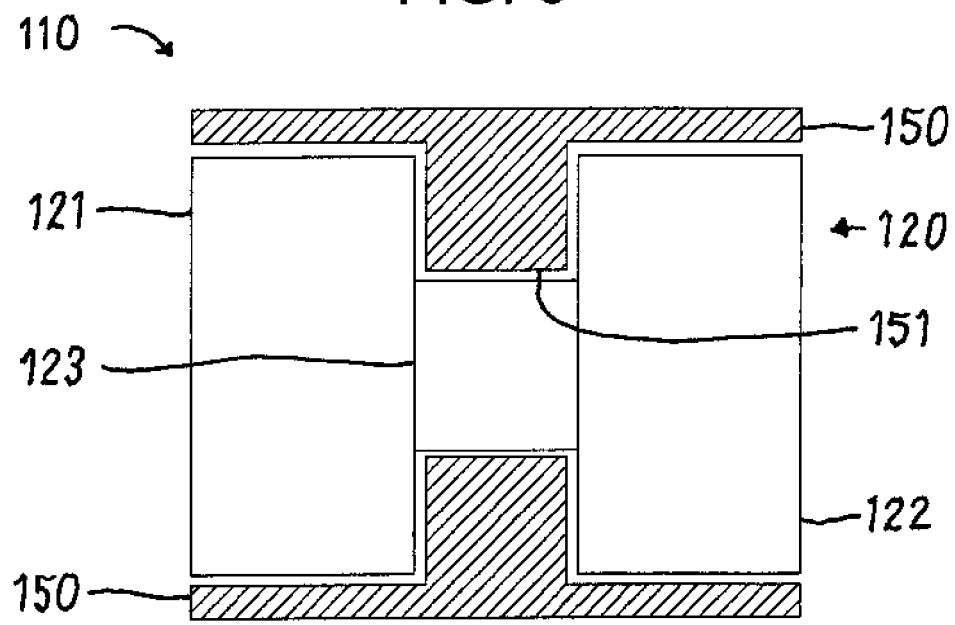
FIG. 5 is a front partial section view of one embodiment of the track assembly of this invention.

This invention is best understood by reference to the drawings. Referring first to FIG. 5, the track assembly 110 of this invention comprises at least one double wheel 120 and a continuous belt 150. These components are discussed in more detail below.

The double wheel has an inner wheel 121, an outer wheel 122, and a recess 123. Coaxial double wheels of this type are conventional and the exact configuration is a matter of choice. For example, the double wheel may be a drive wheel or a non-drive wheel. It may be located at an end of the belt (as shown) or a midway point. The recess of the double wheel may be cylindrical (as shown) or non-cylindrical.

Figure 4:
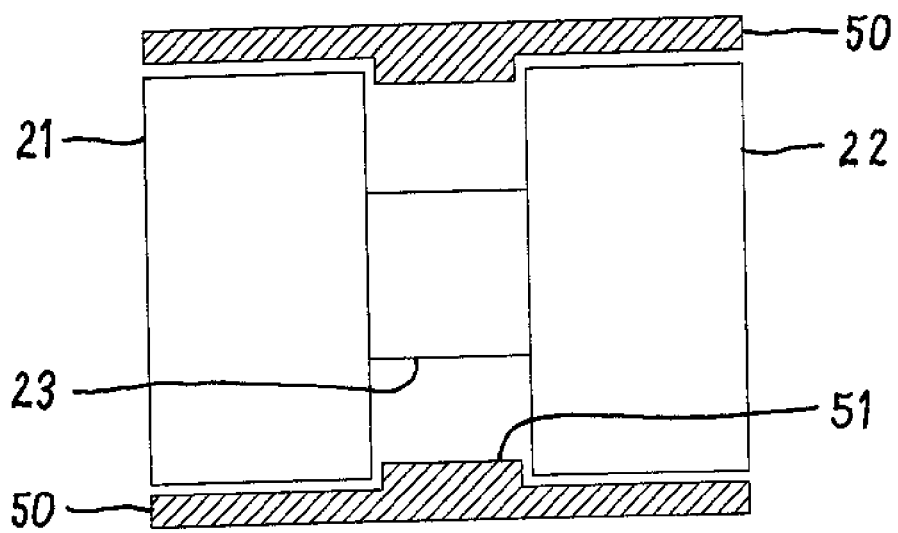
FIG. 4 is a front partial section view thereof.

The belt has a raised support 151 on its inner surface. The raised support contacts and conforms to the recess of the double wheel. The raised support makes contact with the cylindrical recess along substantially all the distance between the inner wheel and the outer wheel. In FIG. 5, the belt is shown a short distance away from the double wheel for illustration purposes. The belt contacts the double wheel in use. A comparison of FIGS. 4 and 5 shows the difference in the raised support of the track assembly of this invention.

Figure 1:
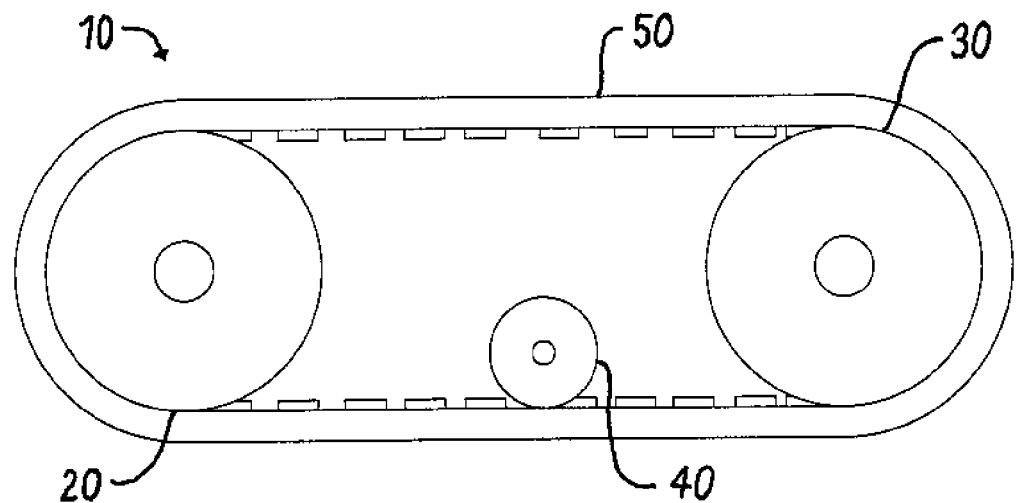
FIG. 1 is a side elevation view of a prior art track assembly.
Figure 2:
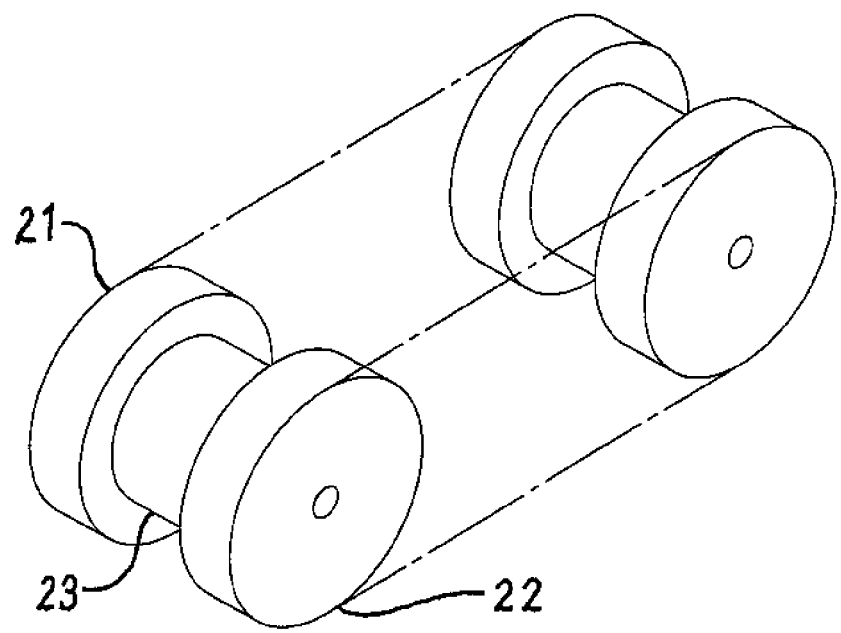
FIG. 2 is a perspective view thereof.
Figure 3:
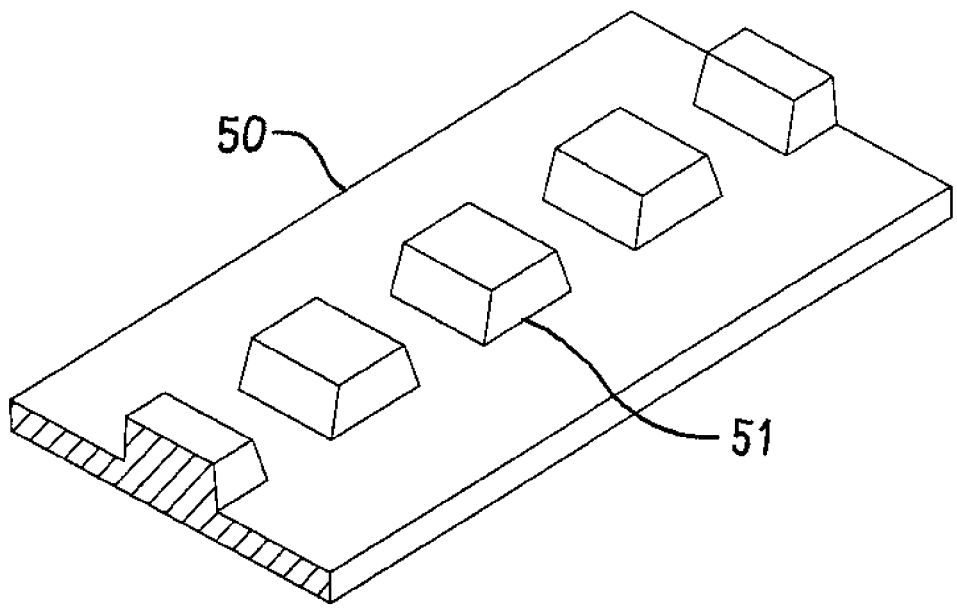
FIG. 3 is a perspective view of a section of the belt thereof.

The raised support generally comprises a series of individual raised supports. The raised supports are similar in structure to the raised supports shown in FIG. 3 except the supports are higher (taller) so they make contact with the recess of the double wheel. The spaces between the supports provide the clearance necessary as the belt bends around the end wheels. If the raised support is sufficiently compressible, the spaces between the supports can be reduced or eliminated. The raised supports also provides the function of the guide blocks and keeps the track aligned.

Figure 6:
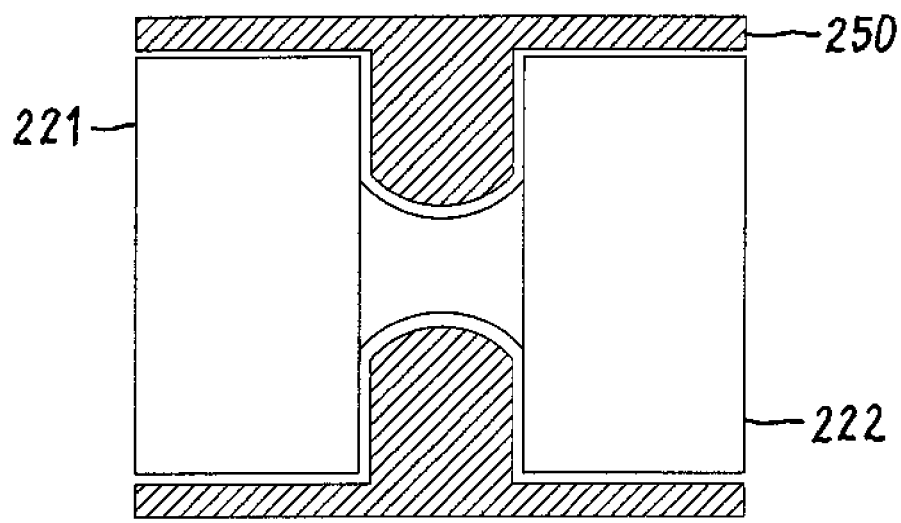
FIG. 6 is a front partial view of a second embodiment of the track assembly of this invention.
Figure 7:
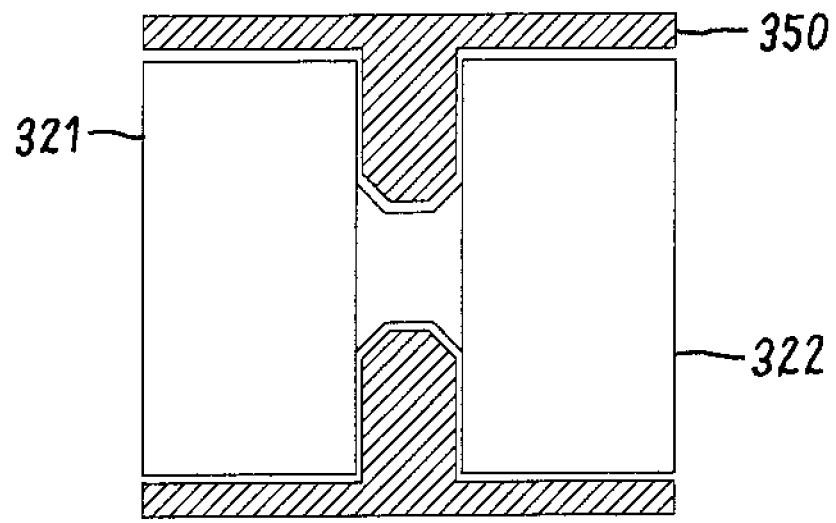
FIG. 7 is a front partial view of a third embodiment of the track assembly of this invention.
Figure 8:
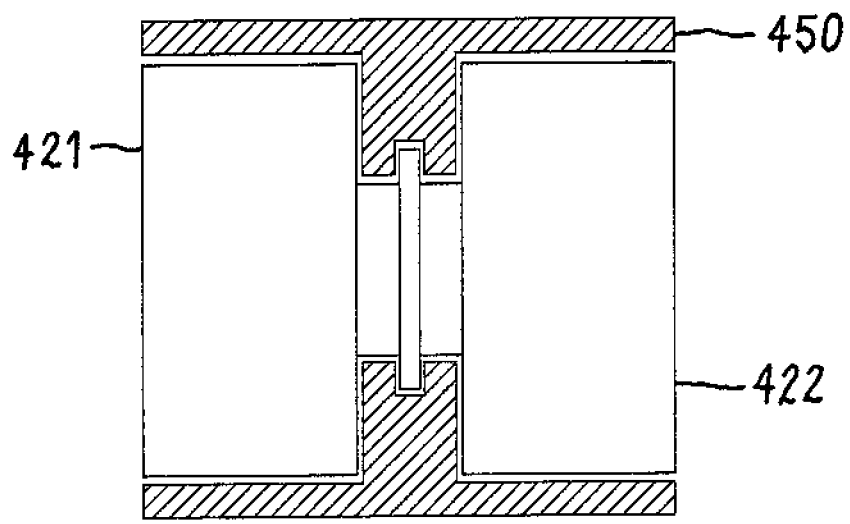
FIG. 8 is a front partial view of a fourth embodiment of the track assembly of this invention.

Alternate embodiments of the double wheel and belt are shown in FIGS. 6 to 8. In FIG. 6, the recess between the inner wheel 221 and the outer wheel 222 is concave and the raised support of the belt 250 is convex. In FIG. 7, the recess between the inner wheel 321 and the outer wheel 322 is hourglass shaped and the raised support of the belt 350 is complementary in shape. In FIG. 8, the recess between the inner wheel 421 and the outer wheel 422 is divided into three cylindrical portions and the raised support of the belt 450 is complementary. The contact between the recess and the belt is preferably along all or substantially the distance between the inner wheel and outer wheel. However, lesser amounts of contact between the recess and the belt are still more desirable than no contact at all.

The contact between the recess of the double wheel and the raised support of the belt ensures that the weight (the gravitational force exerted by the mass) of the vehicle with the track assembly is distributed across the entire width of the belt. This distribution is important when the vehicle travels on a paved road because it reduces heating and rapid wear on the belt. Reducing wear on the belt increases the life of the belt and reduces maintenance costs.

I claim:

1. A track assembly comprising:
   (a) at least one double wheel having an inside wheel, an outside wheel, and a recessed axle portion between the inside wheel and the outside wheel defining an inner width; and
   (b) a continuous belt having an inner surface with a raised support that contacts and conforms to the recessed axle portion of the double wheel along at least a portion of the inner width so the recessed axle portion exerts a gravitational force upon the support when the track assembly is on a paved flat surface.

2. The track assembly of claim 1 wherein the recessed axle portion is cylindrical.

3. The track assembly of claim 2 wherein the recessed axle portion is non-cylindrical.

4. A track assembly comprising:
   (a) at least one double wheel having an inside wheel, an outside wheel, and a recessed axle between the inside wheel and the outside wheel defining an inner width; and
   (b) a continuous belt having an inner surface with a raised support that contacts and conforms to the recess of the double wheel along substantially all the inner width so the recessed axle exerts a gravitational force upon the support when the track assembly is on a paved flat surface.

5. The track assembly of claim 4 wherein the recessed axle is cylindrical.

6. The track assembly of claim 4 wherein the recessed axle is non-cylindrical.

* * * * *